Nov. 11, 1952     J. B. CATALDO ET AL     2,617,909
CIRCUIT BREAKER ASSEMBLY
Filed Jan. 10, 1951     3 Sheets-Sheet 1
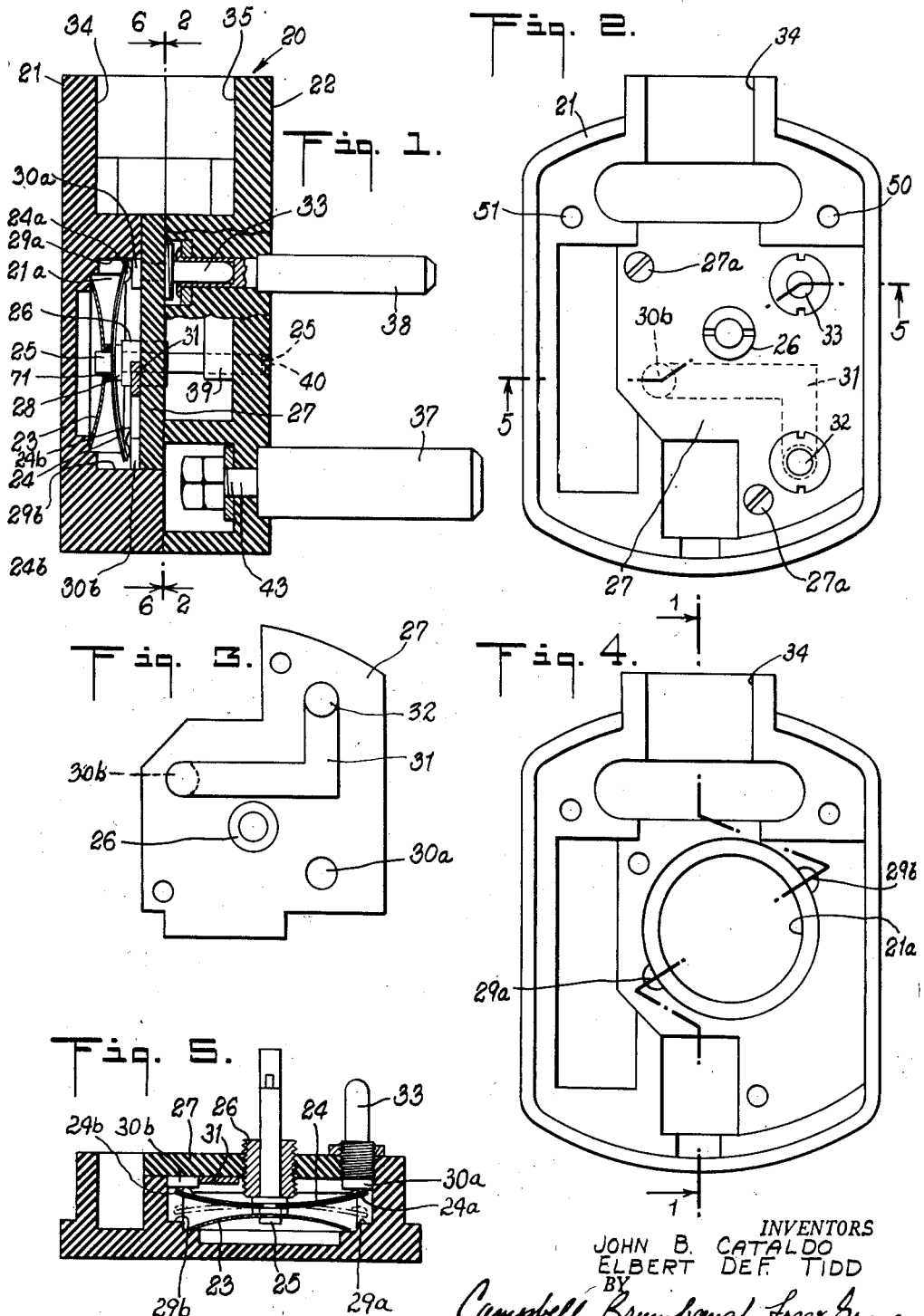
INVENTORS
JOHN B. CATALDO
ELBERT DeF. TIDD
BY Campbell, Brumbaugh, Free & Graves
THEIR ATTORNEYS Nov. 11, 1952     J. B. CATALDO ET AL     2,617,909
CIRCUIT BREAKER ASSEMBLY
Filed Jan. 10, 1951     3 Sheets-Sheet 2
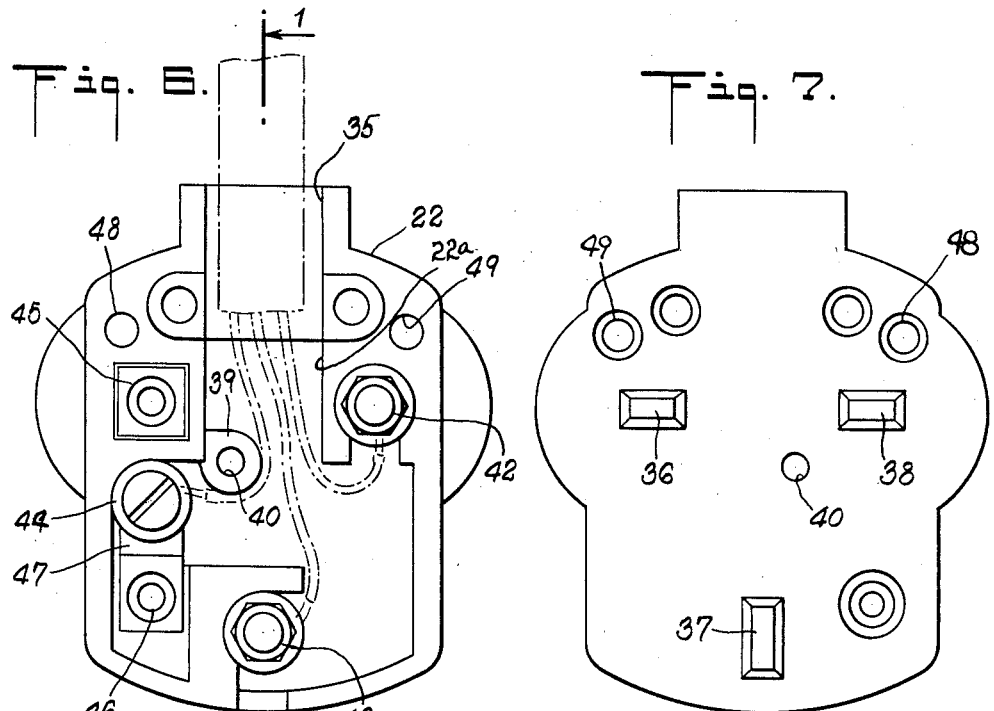
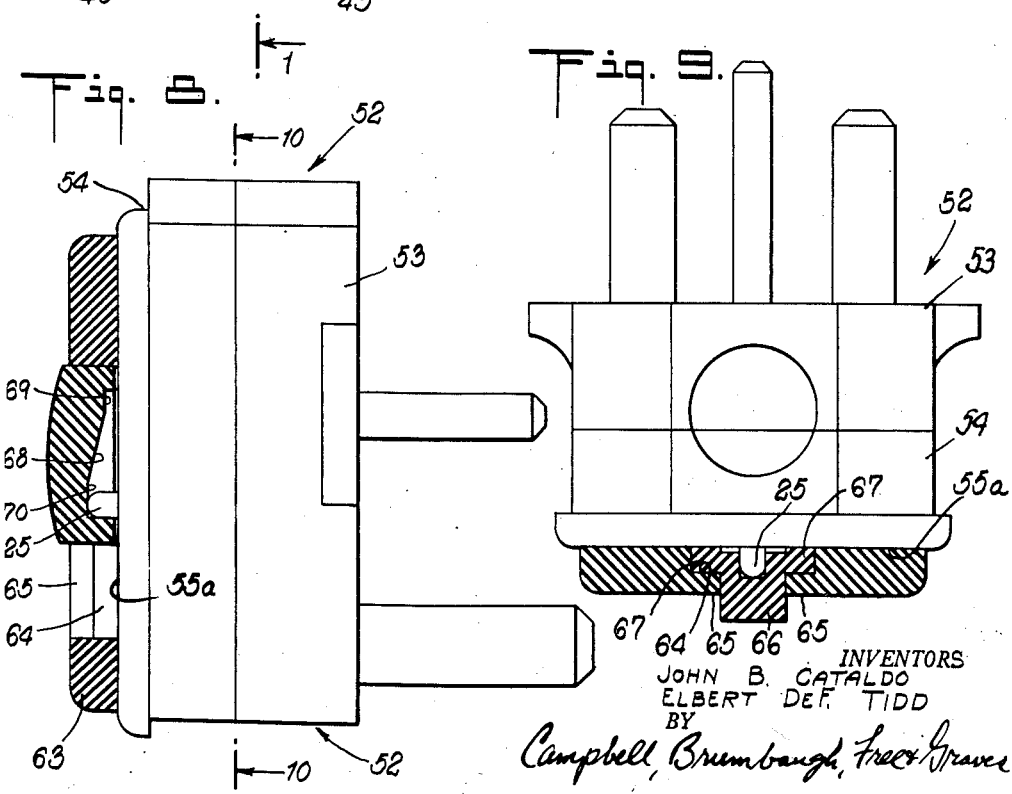
INVENTORS
JOHN B. CATALDO
ELBERT DeF. TIDD
BY Campbell, Brumbaugh, Free & Graves
THEIR ATTORNEYS Nov. 11, 1952 J. B. CATALDO ET AL 2,617,909
CIRCUIT BREAKER ASSEMBLY
Filed Jan. 10, 1951 3 Sheets-Sheet 3

INVENTORS
JOHN B. CATALDO
ELBERT DeF. TIDD
BY
Campbell, Brumbaugh, Free & Graves
THEIR ATTORNEYS Patented Nov. 11, 1952

2,617,909

UNITED STATES PATENT OFFICE 2,617,909

CIRCUIT BREAKER ASSEMBLY

John B. Cataldo, Bernardsville, and Elbert De F. Tidd, Clinton, N. J., assignors to John B. Pierce Foundation, New York, N. Y., a corporation of New York Application January 10, 1951, Serial No. 205,366

9 Claims. (Cl. 200—115.5)

1

This invention relates to circuit breakers and more particularly to assemblies such as cord caps and the like incorporating circuit breaker units as detachable but electrically and mechanically integrated component parts thereof.

In the co-pending patent application, Serial No. 162,492, filed May 17, 1950, entitled "Circuit breaker" and having the same assignee as the instant application, there is disclosed a closely calibrated circuit breaker device which affords trip-free operation and which is built into a cord cap as an inseparable part thereof. This arrangement makes it necessary to replace the entire cord cap and circuit breaker unit in the event it is desired to substitute a circuit breaker portion having different operating characteristics, or in the event it is necessary to make replacements or repairs. This may be both time-consuming and costly, especially in operations using large numbers of units.

It is an object of the invention, therefore, to provide a highly improved assembly design for electrical devices incorporating circuit breakers.

It is another object of the invention to provide a cord cap and circuit breaker assembly which is electrically and mechanically separable into its component parts in a highly efficient manner.

It is a further object of the invention to provide a highly simplified switch and reset mechanism as part of a circuit breaker unit.

According to the invention there is provided a circuit breaker portion including pin and socket connections whereby the breaker may be separably attached to a cord cap portion so that a unified assembly results, with the circuit breaker being automatically connected in the electrical circuit of the cord cap. The cord cap portion may be furnished with suitable terminal blades to be received in standard receptacles, for example, and may be so arranged that all external wiring connections are madet thereto The circuit breaker portion may be provided with various resetting mechanisms which may be either dependent upon or independent of the cord cap portion.

The invention may be better understood by reference to the following description taken in conjunction with the accompanying drawings showing preferred embodiments of the invention in which:

Fig. 1 is a view in longitudinal section of a cord cap assembly including a circuit breaker portion as sectioned on the crooked line 1—1 of Fig. 4 and a cord cap portion as sectioned on the line 1—1 of Fig. 6;

2

Fig. 2 is a plan view of the inside of the circuit breaker portion looking in the direction of the arrows 2—2 of Fig. 1;

Fig. 3 is a plan view of the under-side of an insulating plate lifted from the portion as shown in Fig. 2 and showing the stationary electrical contact assembly of the circuit breaker portion;

Fig. 4 is a plan view of the inside of the circuit breaker portion corresponding to Fig. 2 but with the insulating plate of Fig. 3 removed;

Fig. 5 is a view in cross section taken on the crooked line 5—5 of Fig. 2;

Fig. 6 is a plan view of the inside of the cord cap portion looking in the direction of the arrows 6—6 of Fig. 1;

Fig. 7 is a plan view of the outside surface of the cord cap portion;

Fig. 8 is a side view partly in section of a modified form of the cord cap and circuit breaker assembly;

Fig. 9 is a view in elevation of the assembly shown in Fig. 8;

Figure 10:
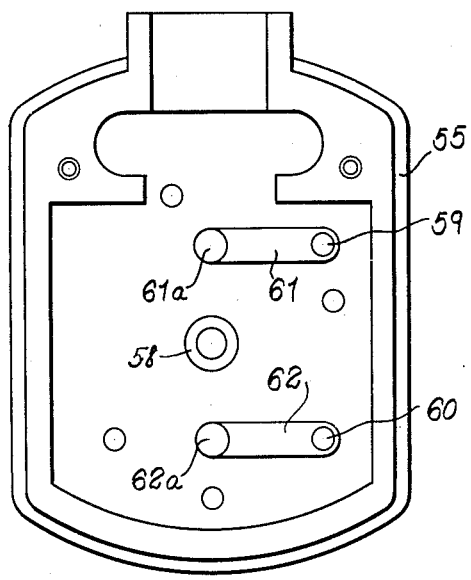
Fig. 10 is a view of the inside of the circuit breaker portion looking in the direction of the arrows 10—10 of Fig. 8.

Referring to the drawings and Fig. 1 in particular, there is shown a cord cap and circuit breaker assembly 20 formed according to the invention and comprising a circuit breaker portion 21 and a cord cap portion 22, the two being electrically and mechanically mated in a separable but unified assembly as described below.

The basic design of the circuit breaker is incorporated in the portion 21 as described in the said co-pending patent application Serial No. 162,492, filed May 17, 1950. In the present embodiment the circuit breaker portion 21 comprises an insulating housing shell of moulded plastic, for example, formed with a circular cavity 21a which receives a monometallic spring disc 23 and a bimetallic thermoresponsive snap spring disc 24 normally disposed back-to-back in slightly compressed relationship as shown in Figs. 1 and 5. If desired an insulating washer 71 may be disposed between the discs to limit heat transfer therebetween. The discs are each formed with a central aperture to receive one end of a reset shaft 25 slidably mounted in a bushing 26 which is adjustably threaded in an insulating plate 27 attached to the housing portion 21 by screws 27a. The circuit breaker portion thus comprises two insulating body portions 21 and 27. The reset shaft 25 is formed with a shoulder 28 which bears against the bushing 26 due to the spring action of the spring disc 23.

The bimetallic disc 24 carries at its periphery at substantially diametrically opposed points a pair of overhanging, movable electrical contacts 24a and 24b received in recesses 29a and 29b respectively, as best seen in Fig. 4. The contacts 24a and 24b are normally in engagement with corresponding stationary contacts 30a and 30b, respectively, secured to the under-side of the insulating plate 27. The disc 24 is formed, at least partially, of electrically conducting material and completes an electrical circuit between the stationary contacts 30a and 30b.

The basic operation of the disc assembly of the circuit breaker may be best described with reference to Fig. 5. The bimetallic disc 24 is designed to snap between two configurations, as shown in full and broken lines, under the inflence of heat, and the trip-point of the disc is a function of the fixed or inherent properties of the disc and the adjustable spring biasing force as applied by the disc 23. In this case heating is caused by the passing of the electrical current of the protected circuit directly through the disc. In reversing the configuration as a result of overheating, the circuit between the contacts 30a and 30b is broken and the circuit is not reestablished until the circuit breaker is reset manually by means of the reset pin or shaft 25 which is first pushed inwardly against the action of the spring disc 23 carrying the disc 24 in translation until the contact elements 24a and 24b, respectively, engage the bottoms of the respective recesses 29a and 29b. Further movement of the push shaft biases the disc 24 to its initial or cold configuration. This, however, does not close the electrical circuit and it is necessary to release the push shaft 25 to allow the spring disc 23 to return the disc 24 in translation to reestablish the electrical circuit. It will be understood that adjustment of the trip-point of the disc assembly is effected by means of the threaded bushing 26.

The electrical circuit to the stationary contact 30b includes an L-shaped bus-bar 31 carried on the under-surface of the insulating plate 27, one end of which is electrically connected to the contact 30b and the other end of which is electrically connected to a terminal post extension pin 32 (Fig. 2) which projects outwardly from the surface of the insulating plate 27. The electrical contact 30a is electrically connected to a second terminal post or extension pin 33 which also projects outwardly from the surface of the insulating plate 27. The pin assemblies 32 and 33 are preferably threaded into the plate 27 and secured by a lock nut.

The circuit breaker portion 21 is also formed with a half-round recess 34 for receiving an incoming electrical cord, in combination with a corresponding half-round section 35 formed in the cord cap portion 22, the two portions being adapted to be fitted together as shown in Fig. 1. The housing portion 22 as shown in particular in Figs. 6 and 7, supports three electrically conducting blades 36, 37 and 38, extending outwardly therefrom and serving as terminal means adapted to be connected to a source of electrical energy through a conventional receptacle, for example. The inner surface of the housing 22 is formed with a cavity 22a for receiving the conductors of the electrical cord and barriers may be provided as needed to separate the conductors. A boss 39 formed with a central aperture 40 is provided for receiving the reset shaft 25 of the circuit breaker portion 21 described above. Preferably the reset shaft extends well into the portion 22 so as to be accessible from the underside of the cord cap portion 22, as shown in Fig. 1. If desired the opening 40 which receives the reset shaft 25 may be so formed that a special tool or key is required to actuate the reset shaft, thereby preventing unauthorized resetting of the circuit breaker.

Secured in the housing 22 are terminal means or binding posts 42, 43 and 44 for receiving, respectively, the conductors of a three-wire electrical cord. Also mounted in the housing section 22 are a pair of receptacles or socket elements 45 and 46 for receiving, respectively, the extension pins 32 and 33 of the circuit breaker portion in an electrical connection when the two portions 21 and 22 are assembled.

The electrical circuit of the particular cord cap disclosed is such that the blade 36 is the neutral connection, blade 37 is the grounded connection, and blade 38 is the fused connection. The blade 36 is electrically connected directly to the binding post 42, and the blade 37 is electrically connected directly to the binding post 43. The blade 38, however, is connected to the receptacle 45, which receives the pin 33 of the circuit breaker portion. The binding post 44 is connected by means of a bus-bar 47 to the receptacle 46, which receives the pin 32 of the circuit breaker portion. Thus the disc circuit as described above is connected in series with the blade 38 and binding post 44, the electrical circuit comprising the blade 38, receptacle 45, pin 33, stationary contact 30a, movable contact 24a, bimetallic snap disc 24, movable contact 24b, stationary contact 30b, pin 32, receptacle 46, bus-bar 47 (Fig. 6), and binding post 44, the electrical lead to which comprises the fused line of the three-wire system described.

The two halves of the assembly including the circuit breaker portion 21 and the cord cap portion 22 may be secured together by any suitable means such, for example, as screws received in suitable openings 48 and 49 in the cord cap portion and in tapped holes 50 and 51 in the circuit breaker portion.

Figure 11:
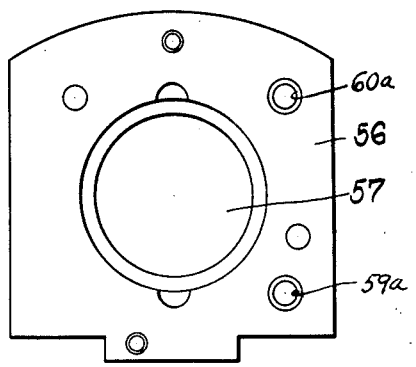
Fig. 11 is a plan view of the under-side of an insulating plate for housing the works of the circuit breaker portion.
Figure 13:
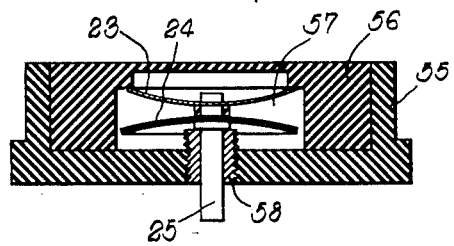
Fig. 13 is a view in transverse section taken on the line 13—13 of Fig. 12.
Figure 12:
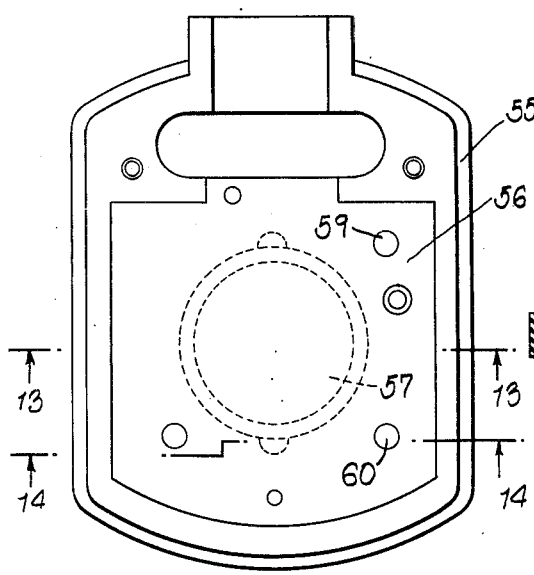
Fig. 12 is a plan view of the inside of the circuit breaker portion similar to Fig. 10 but showing the insulating plate in position.
Figure 14:
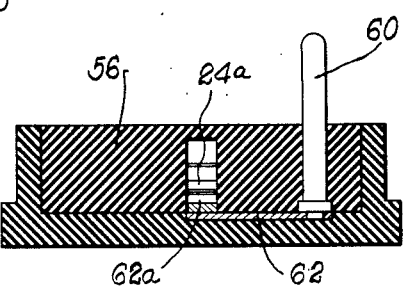
Fig. 14 is a view in transverse section taken on the line 14—14 of Fig. 12.

In the embodiment of the invention as described above, resetting is effected by removing the assembly 20 as a unit from the receptacle and pressing inwardly on the reset shaft 25. If desired, however, the mechanism may be modified according to the invention so that resetting may be accomplished without removing the unit from its receptacle. Thus, referring to Figs. 8 and 9 there is shown a unified cord cap and circuit breaker assembly 52 comprising a cord cap portion 53 and a circuit breaker 54. The cord cap portion 53 is for the most part the same as the cord cap portion 22 described above with reference to Figs. 6 and 7. The circuit breaker portion 54, however, is modified so that the reset shaft is operated from the outer surface of the assembled unit so that the cord cap need not be removed from the receptacle to reset the circuit breaker. To this end the circuit breaker portion 54 comprises a housing shell 55 (Figs. 10–14) in which is fitted an insulating insert portion 56 formed on its inner surface with a circular cavity 57 for receiving the spring disc 23 and thermoresponsive bimetallic disc 24 arranged in the manner described above. In this embodiment the reset shaft 25 extends in the opposite direction and is slidably received in a bushing 58 threaded in the face of the shell 55. A pair of extension pins 59 and 60, received in through-bores in the insert portion 56, are electrically connected by means of bus-bars 61 and 62, respectively, to stationary contacts 61a and 62a so that an electrical circuit is established through the bimetallic disc 24 in the same fashion as described above. The extension pins 59 and 60 are received in receptacles, such as 45 and 46, carried by the cord cap portion as shown in the preceding embodiment of the invention.

If desired a switch assembly may be provided according to the invention for use with the circuit breaker portion 54 in order to facilitate the operation of the reset mechanism and also to provide an effective off-on switch for the electrical circuit. Thus, referring to Figs. 8 and 9, a coverplate 63 formed of insulating material may be attached to the outer surface of the circuit breaker portion 54, the cover plate being formed with an elongated slot 64 for receiving the reset shaft 25 and having overhanging shoulders 65. Received in the slot 64 for sliding movement on the outer surface 55a of the housing shell 55 is a slide member 66 formed with laterally extending foot portions 67 underlying the shoulders 65. The under-side of the slide member 66 is formed with an inclined cam surface 68 having flat parallel end portions 69 and 70.

In operation after the circuit breaker has been tripped and it is desired to reset it, the slide member 66 is first moved in its slot (downwardly as viewed in Fig. 8) so that the cam surface 68 drives the pin 25 inwardly to reverse the configuration of the disc 24 as described above. It is then necessary to return the slide member 66 to its initial position to reestablish the electrical circuit. It will be understood that the flat end portion 69 enables the slide member 66 to hold itself in the reset position. Thus the slide member 66 may be used as an off-on switch, this for the reason that the electrical circuit is opened when the reset shaft 25 is disposed in its inner position, regardless of the configuration of the snap disc 24.

If it is desired to provide a system in which the off-on feature is not present, the flat portion 69 may be dispensed with so that the spring action of the discs on the push shaft 25 will cause the slide member 66 to be driven by the cam surface to its initial position after each resetting operation.

By virtue of the novel design of the circuit breaker and cord cap portions as disclosed herein, it will be apparent that various circuit breaker portions may be used interchangeably with a single cap portion. For example, a circuit breaker portion may be used whereby it is necessary to remove the cord cap from its receptacle in order to perform the resetting operation. Such device is shown in Figs. 1–7. Alternatively a circuit breaker portion may be used which enables the breaker mechanism to be reset without removing the cord cap from its receptacle. Such device is shown in Figs. 8–14. In any case the changing of circuit breaker portions may be quickly effected without disconnecting any electrical wires. Moreover a cord cap may be used with a blank cover which does not include any circuit breaker apparatus and which results in an unprotected plug. Such arrangement (not illustrated) comprises essentially a shorting bar carried by the blank cover and furnished with extension pins at either end adapted to be received in suitable receptacles in the cord cap portion, such, for example, as those identified by the numerals 45 and 46 in the embodiment shown in Fig. 6.

It will be understood, therefore, that the invention has been disclosed herein as embodied in several illustrative forms and that numerous changes in the design may be made without departing from the scope of the invention, which should not, therefore, be limited in scope save as defined in the following claims.

We claim:

1. In combination, a cord cap and circuit breaker assembly adapted to be attached to an electrical cord having at least two electrical conductors therein, comprising a first housing portion having at least first and second electrically conducting blades extending outwardly therefrom and adapted to be connected to a source of electrical energy, a socket electrically connected to and formed on the inner end of the first of said blades, a first terminal means adapted to receive one conductor of said electrical cord, said first terminal means being electrically insulated from said first blade, a second terminal means formed on the inner end of the second of said blades and adapted to receive a second conductor of an electrical cord, a second socket electrically connected to said first terminal means, a second housing portion including first and second pin connectors adapted to be detachably received in said first and second socket portions, stationary contact means mounted in said housing portion electrically connected to each of said pin connectors, circuit breaker means normally completing an electrical circuit between said stationary contacts, thereby to complete a normally closed electrical circuit between said first blade and said second terminal means of the first housing portion, and reset means for said circuit breaker means constructed and arranged to be operable from an exposed surface of the cord cap with said first and second housing portions assembled.

2. A cord cap and circuit breaker assembly as set forth in claim 1 including cooperating wall means formed in said first and second housing portions for forming an opening to receive said electrical cord, said wall means defining complementary recesses in each housing portion.

3. A cord cap and circuit breaker assembly as set forth in claim 1, said first blade comprising a ground line and said second blade comprising the line which includes the circuit breaker, a third blade carried by said first housing portion comprising a neutral line and a third terminal means electrically connected to said third blade adapted to receive a third electrical conductor.

4. A cord cap assembly having electrically conducting blades extending outwardly from a surface thereof and adapted to be received in a receptacle and terminal means adapted to receive electrical conductors of an electric cord to be connected electrically to said blades, comprising, a first housing portion carrying said blades and said terminal means, a second housing portion, circuit breaker means mounted in said second housing portion, means including separable electrical connectors for electrically connecting said circuit breaker in series between at least one of said blades and at least one of said terminals for detachably assembling said first and second housing portions, and reset means for said circuit breaker means operable from an exposed surface of the cord cap assembly with the first and second housing portions assembled.

5. A cord cap assembly as set forth in claim 4, said second housing portion comprising two body portions, cooperating wall means on said body portions defining a recess for receiving said circuit breaker means, said circuit breaker means comprising a pair of stationary electrical contacts carried by one of said body portions, means electrically connecting one of said contacts to one of said blades and the other of said contacts to one of said terminal means, said reset means comprising a movable member, a spring member urging said movable member in one direction, a bimetallic snap spring disc adapted to snap from one configuration to another under the influence of heat, said disc being carried by said movable member, said snap spring disc being adapted to engage said stationary electrical contacts to form an electrically conducting path therebetween, whereby said disc upon changing configuration under the influence of heating by the passage of electrical current therethrough, opens the circuit between said contacts, said movable member being adapted to displace said disc in translation to cause said disc to be snapped from its second to its first configuration, said movable member extending outwardly from the second housing portion to be accessible from a point external of the cord cap assembly.

6. A cord cap assembly as set forth in claim 4, said reset means comprising a movable member extending outwardly from the second housing portion and said first housing being formed with an opening for receiving said movable member when the first and second housing portions are assembled, said movable member being accessible from the surface of the first housing portion from which the electrically conducting blades extend.

7. A cord cap assembly as set forth in claim 4, said second housing portion carrying said reset means.

8. A cord cap assembly as set forth in claim 7, said reset means including an axially movable shaft connected to said movable member, and a slide member mounted in said second housing and movable between two positions, said slide member being formed with a cam surface for actuating said shaft, whereby said circuit breaker means may be reset by movement of said slide member.

9. A cord cap assembly including first and second housing portions adapted to be detachably fitted together as a unified assembly, said first and second housing portions including cooperative wall means defining complementary recesses in each housing portion for forming an opening for receiving an electrical cord, at least first and second terminal means mounted in said first housing portion to receive electrical conductors of an electrical cord, at least two electrically conducting blades carried by said first housing portion and extending outwardly therefrom to be inserted in an electrical fixture, wall means defining a cylindrical cavity in said second housing portion, a movable reset member disposed in said cavity coaxially therewith and movable between first and second positions, a bimetallic snap spring disc centrally mounted on said movable member, said disc being adapted to snap between first and second configurations under the influence of heat as developed by the passage of electrical current therethrough, spring means reacting between said housing and movable member to urge the movable member in the direction of its first position, an insulating plate portion overlying the cavity and the circuit breaker means therein, said plate portion and said first housing portion being apertured to receive the said movable member, electrical contact means carried on the underside of said plate portion for cooperative action with the circuit breaker portion, cooperative separable plug and socket means on the outer surface of the said plate portion and second housing portions for establishing an electrical circuit including in series one of said blades, said disc in its first configuration and one of said terminal means, said disc being adapted upon the passage of overload current therethrough to snap to its second configuration to open the electrical circuit, shoulder means in said second housing portion, said movable member being adapted to carry said disc in translation to engage said shoulder means to cause the disc to be snapped from its second to first configuration, said electrical circuit being maintained open until the movable member is returned to its first position.

JOHN B. CATALDO.
ELBERT DE F. TIDD.

REFERENCES CITED

The following references are of record in the file of this patent:

UNITED STATES PATENTS

| Number | Name | Date |
|--------|------|------|
| 1,864,353 | Hubbell, Jr. | June 21, 1932 |
| 1,968,213 | Lofgren | July 31, 1934 |
| 2,183,518 | Rivers | Dec. 12, 1939 |
| 2,508,637 | Bolesky | May 23, 1950 |
| 2,555,685 | Doss | June 5, 1951 |